United States Patent [19]

Matthews

[11] Patent Number: 4,955,137
[45] Date of Patent: Sep. 11, 1990

[54] MECHANISM FOR ADJUSTING DEPTH OF CUT ON WIRE AND CABLE JACKETS

[75] Inventor: James J. Matthews, East Haddam, Conn.

[73] Assignee: Ripley Company, Inc., Cromwell, Conn.

[21] Appl. No.: 320,278

[22] Filed: Mar. 6, 1989

[51] Int. Cl.⁵ .................. B21F 13/00; B26B 27/00
[52] U.S. Cl. ................................. 30/90.1; 30/90.6
[58] Field of Search .................. 30/90.1, 90.3, 90.6, 30/90.4, 152, 289; 81/9.5, 9.4

[56] References Cited

U.S. PATENT DOCUMENTS

| | | | |
|---|---|---|---|
| D. 301,970 | 7/1989 | Matthews . | |
| 2,398,979 | 4/1946 | Vaughan, Jr. . | |
| 2,468,122 | 4/1949 | Shepard . | |
| 3,169,315 | 2/1965 | Mankovitz | 30/90.6 |
| 3,869,791 | 3/1975 | Horrocks | 30/90.1 |
| 4,368,654 | 1/1983 | Kober | 30/9.1 |
| 4,449,298 | 5/1984 | Putz | 30/90.1 |
| 4,489,490 | 12/1984 | Michaels | 30/90.1 |
| 4,667,406 | 5/1987 | Krampe | 30/90.1 |

FOREIGN PATENT DOCUMENTS

| | | | |
|---|---|---|---|
| 623834 | 2/1963 | Belgium | 30/90.1 |
| 1337068 | 7/1963 | France . | |

Primary Examiner—Douglas D. Watts
Assistant Examiner—Paul M. Heyrana, Sr.
Attorney, Agent, or Firm—DeLio & Associates

[57] ABSTRACT

A tool for stripping jackets from cable insulation comprising means for holding a portion of the cable and means for clamping the cable against the holding means and cutting the jacket. The clamping and cutting means includes a surface for bearing against the exterior of the jacket on the cable and a cutter member for cutting the jacket, the cutter member being adjustable toward and away from the cable to vary the depth of cut of the jacket of cable held in the holding means. A cable jacket clamping and cutting device may be mounted on a tool having a pair of perpendicular, intersecting channels for holding cable and a releasable, spring-loaded lever arm for urging the device against cable held in either of the channels at a point above the intersection of the channels whereby the tool is rotatable and slidable relative to the axis of the cable to cut the cable jacket around its circumference and parallel to the axis. The device comprises a housing having means for mounting on the lever arm; a surface on the housing lower side for bearing against the exterior of the jacket to clamp cable in either of the channels; and a cutter member for cutting the jacket. A vertical shaft having threads on at least a portion of its exterior secures the cutter member. An annular knob rotatable in the housing having interior threads mating with the shaft threads moves the shaft and the cutter member toward and away from the cable to vary the depth of cut of the jacket of cable held in either of the channels.

26 Claims, 2 Drawing Sheets

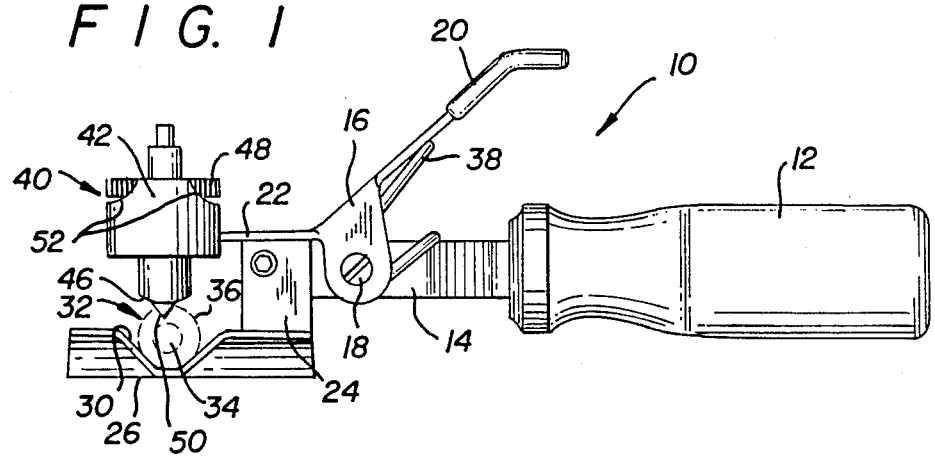
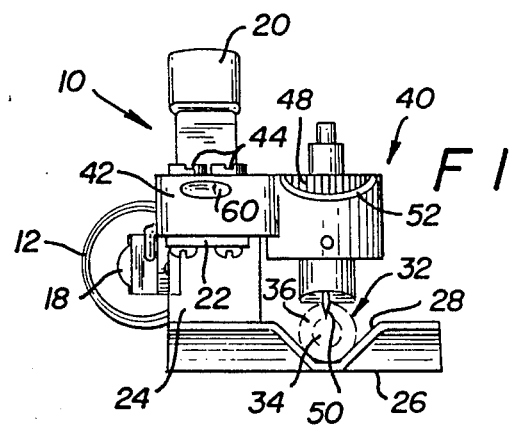
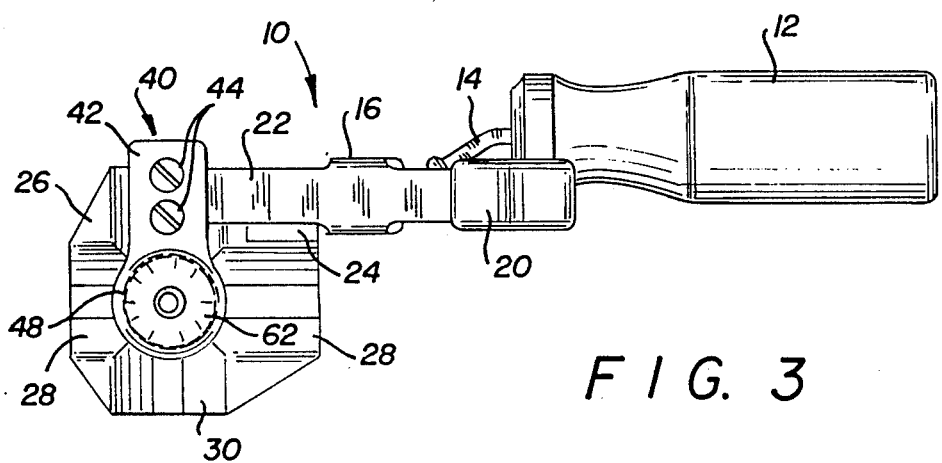

MECHANISM FOR ADJUSTING DEPTH OF CUT ON WIRE AND CABLE JACKETS

BACKGROUND OF THE INVENTION

The present invention relates to a tool for stripping semi-conductive jackets from electrical cable insulation, and in particular, to a tool which incorporated an adjustable cutter member for varying the depth of cut of the cable insulation jacket.

Wire or cable stripping devices have long been known in the art and comprise many different types. Exemplary among these types are the stripping devices disclosed in U.S. Pat. No. 2,468,122 to Shepard, U.S. Pat. No. 2,398,979 to Vaughan, Jr. and French Patent No. 1337068. Of particular interest in connection with the present invention is the type of wire stripper disclosed in U.S. Pat. No. 3,169,315 to Mankovitz. A version of this stripper is sold by the Ripley Company, assignee of the subject application, under the registered trademark Banana Peeler. This type of cable stripper utilizes a handle attached to a clamping plate for the cable which has a pair of perpendicular, intersecting channels stamped therein. A spring loaded cutter, above the point of intersection of the two channels, contains a cutting member for scoring the cable insulation jacket. In stripping the cable end, the cable is placed in the channel perpendicular to the axis of the tool. The tool and cutter member are rotated around the cable to score the jacket around its circumference. The cable is then placed in the channel parallel to the axis of the tool, and the tool is pulled so that the cutter member scores the jacket parallel to the axis of the cable from the circumferential cut to the end. This operation is then repeated several times around the circumference of the cable to produce parallel score lines. The ends of the rectangular strips formed by this operation are then lifted and peeled off the insulation (in the fashion of peeling a banana). It is imperative that the insulation not be cut during the stripping process as this will result in failure of the cable when energized.

Although cable strippers of the type similar to the Banana Peeler stripper described above generally perform well, there are drawbacks. These types of tools usually include only cutter members with specific depths of cut and, in order to accommodate cable with different sizes and different types of jacket, it is necessary to change the particular cutter member used. This usually entails time consuming efforts by the user between stripping cuts.

Bearing in mind the problems and deficiencies of the prior art, it is therefore an object of the present invention to provide a cable scoring tool which permits easy selection of a particular depth of cut of the cable jacket.

It is another object of the present invention to provide a cable stripping tool in which the depth of cut can be varied continuously to accommodate different size cables and cable jackets.

It is another object of the present invention to provide a cable stripping tool which is of relatively simple design and easy to manufacture.

It is a further object of the present invention to provide a cable stripping tool meeting the aforementioned objects in which the cutting depth of the cutter member may be fixed if so desired.

It is yet another object of the present invention to provide a device which may be retrofitted on existing cable stripping devices which accomplishes the objects described above.

SUMMARY OF THE INVENTION

The above and other objects, which will be apparent to those skilled in the art, are achieved in the present invention which provides a tool for stripping semi-conductive jackets from cable comprising means for holding a portion of the cable and means for clamping the cable against the holding means and cutting the jacket. The clamping and cutting means includes a surface for bearing against the exterior of the jacket on the cable and a cutter member for cutting the jacket, the cutter member being adjustable toward and away from the cable, relative to the bearing surface, to vary the depth of cut of the jacket of cable held in the holding means.

In its preferred embodiment, the present invention provides a cable clamping and jacket cutting device for mounting on a tool having a pair of perpendicular, intersecting channels for holding cable and a releasable, spring-loaded lever arm for urging the device against cable held in either of the channels at a point above the intersection of the channels whereby the tool is rotatable and slidable relative to the axis of the cable to cut the cable jacket around its circumference and parallel to the axis. The device comprises a housing having means for mounting on the lever arm; a surface on the housing lower side for bearing against the exterior of the jacket to clamp cable in either of the channels; and a cutter member for cutting the jacket. A vertical shaft having threads on at least a portion of its exterior secures the cutter member. An annular knob rotatable in the housing having interior threads mating with the shaft threads moves the shaft and the cutter member toward and away from the cable to vary the depth of cut of the jacket of cable held in either of the channels.

BRIEF DESCRIPTION OF THE DRAWINGS

FIG. 1 is a side elevational view of the preferred embodiment of the present invention.

FIG. 2 is a front elevational view of the embodiment of FIG. 1.

FIG. 3 is a top plan view of the embodiment of FIG. 1.

DETAILED DESCRIPTION OF THE INVENTION

Figure 4:
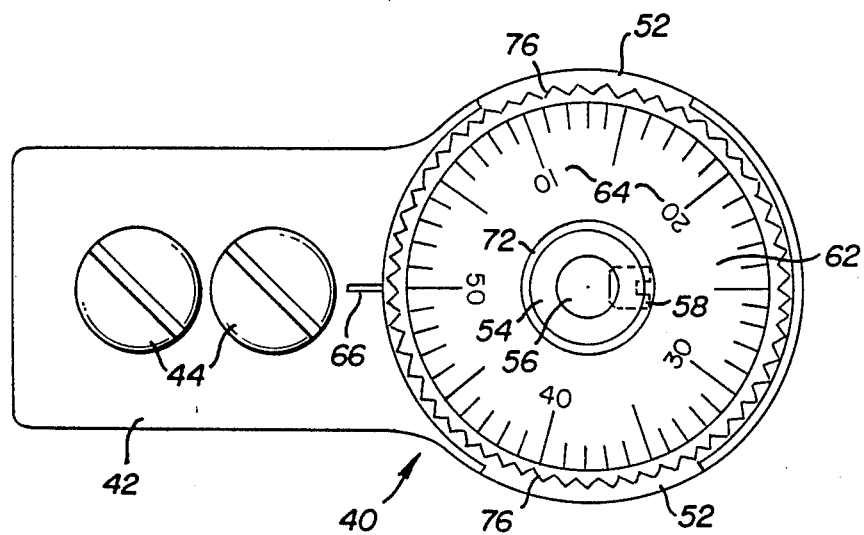
FIG. 4 is a top plan view of the preferred adjustable cutting and clamping device of the present invention.

The present invention will be further described with respect to FIGS. 1-5, which illustrate the preferred embodiment. Like numerals refer to like features in the Figures. Except where otherwise indicated, the components of the present invention are made of a metal, alloy or some other hard, durable material.

The preferred hand tool embodiment of the present invention is shown in FIGS. 1, 2 and 3 in side, end and top views, respectively. Tool 10 generally comprises a plastic handle 12 from which extends a shank 14 at the forward end. A clamping plate 26 is secured by block 24 to the forward end of shank 14 for holding a desired portion of the cable to be stripped. Clamping plate 26 contains approximately "V" shaped stamped channels 28 and 30. Channel 28 is roughly parallel to the axis of the tool along shank 14 and handle 12. Channel 30 is perpendicular to both channel 28 and the tool axis. The channels 28 and 30 and clamping plate 26 are sized to securely hold the lower portion of the cable and, because of their open configuration, will permit cables of various sizes to be held thereby.

A clamping and cutting mechanism 40 is disposed at the forward end of tool 10 above the intersection of clamping plate channels 28 and 30. Mechanism 40 is secured by screws 44 to the forward end of lever arm 22 extending from clamping member 16 pivoted about pin 18 on shank 14. Lever arm 22 is spring-loaded in a downward position by a coil type spring 38 having ends acting against shank 14 and member 16. In its lowest position, arm 22 rests against the top of block 24. Member 16 includes a rearward extending plastic-coated thumb lever 20 which permits the tool user to grasp tool 10 in one hand by handle 12 and lift mechanism 40 by downward pressure on thumb lever 20.

To clamp and hold a cable securely against the channels of clamping plate 26, mechanism 40 includes a lower bearing surface 46 to press against the top surface of the cable 32 (shown in phantom in channels 28 and 30 in FIGS. 1 and 2, respectively). Cutting member 50 extends downward through an opening in surface 46 to cut the plastic or other jacket 36 of cable 32. Cutting member 50 is shown as a flat, triangular cutting blade with cutting edges on both sides and having a cutting direction essentially parallel to the longitudinal axis of tool 10. Cutting member 50 is adjustable up and down by movement of knob 48 at the upper end of the clamping and cutting device housing 42 to vary the depth of cut of the jacket of cable 32 while it is held in clamping plate 26. Relief sections 52 in housing 42 allow easy rotation of dial 48 along knurled edges to move the cutting member 50 either toward or away from cable 32. A dial 62 secured to the top of knob 48 includes visible indicia to set the distance the cutting edge of cutting member 50 extends below surface 46.

Figure 5:
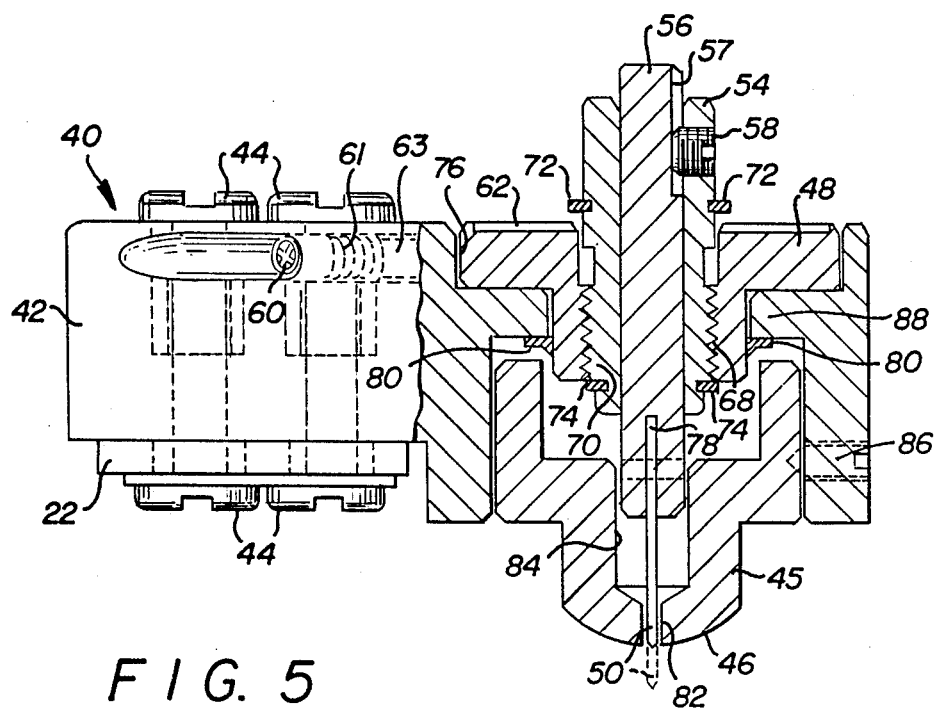
FIG. 5 is a side elevational view, partially cut away and partially in cross section, of the cutting and clamping device of FIG. 4.

More detailed top and plan views of the adjustable clamping and cutting device 40 are illustrated in FIGS. 4 and 5, respectively. Device housing 42 is secured generally perpendicular to lever arm 22 by screws 44 which extend through the thickness of the housing, as shown in phantom lines. As shown in FIG. 5, the right hand portion of housing 42, which extends over the intersection of channels 28 and 30, has a generally cylindrical cavity with an inwardly-extending shoulder 88. An annular adjusting knob 48 rides atop shoulder 88 in the cavity and includes a central cylindrical portion extending between and below the shoulder and a separate retaining ring 80 which prevents upward removal of knob 48 while allowing free rotation within housing 42. Disposed within the lower portion of the housing cavity is the lower housing member 45, secured by a set screw 86, which includes the bearing surface 46 on its lower side. Surface 46 contains a rectangular slotted opening 82 which permits passage of cutter member 50.

To permit vertical adjustment of cutting member 50, there is provided a central shaft which includes a shaft sleeve 54. Interior screw threads 68 within the central opening of knob 48 mate with correspondingly sized exterior threads 70 on the lower portion of shaft sleeve 54. A cylindrical shaft central member 56 is fitted within a correspondingly shaped opening extending along the axis of sleeve 54. Shaft central member 56 includes a slot 78 at its lower end which receives the upper portion of cutter member 50, secured therein by rivets or other means. Set screw 58 in the wall of the upper end of sleeve 54 acts against flat 57 to secure the central member 56 against relative vertical or rotational movement within the sleeve. A cylindrical opening 84 in the interior of lower housing member 45 permits vertical movement of the lower portion of shaft central member 56.

Adjusting knob 48 includes knurled edge 76 which is accessible above relief areas 52 in housing 42. Rotation of knob 48 results in vertical movement of shaft central member 56 and sleeve 58 within housing 42. Sliding contact between the rectangular cutter member 50 and the rectangular shaped slot 82 prevents rotation of shaft central member 56 and sleeve 58. Upper and lower retaining rings 72 and 74, respectively, are inset on shaft sleeve 54 above and below adjusting knob 48 to act as stops to downward and upward movement, respectively, of cutter member 50.

The depth of cut of cutter member 50 into a cable jacket, determined by the distance of extension beyond lower surface 46, may be measured by dial 62 which is inset on the top surface of knob 48. Numerical or other markings 64 provide indicia for determining the position of cutter member 50. In the embodiment shown in FIGS. 4 and 5, screw threads 68 and 70 have a pitch which results in the vertical movement of 0.050 inches per revolution. Dial indicator 62 has corresponding gradations of from 0 to 50 mils.

When the dial reading is 0 as measured against line marking 66 on the top surface of housing 42, cutter member 50 is fully retracted within lower housing 45 and even with the surface 46, and retaining ring 74 contacts the lower portion of knob 48. The distance cutter member 50 is extended below surface 46 can be easily measured from the dial 62 as knob 48 is rotated.

A set screw 60 rests against a spring 61 in a cylindrical opening in housing 42, which in turn presses against a detent plunger 63 whose forward edge (not shown) engages the knurled grooves 76 along the periphery of knob 48 (50 grooves total around the circumference of knob 48). This detent mechanism ensures positive holding of the knob 48 for the desired depth of cut.

Should it be necessary to change cutter member 50, removal of set screw 58 will permit central member 56 to be removed from sleeve 54 whereupon a new cutter member can then be inserted. Recalibration of the zero position of dial gauge 62 will be necessary when cutter member 50 is replaced.

The clamping and cutting device described herein may be provided as part of a kit to be retrofitted onto prior cable strippers, such as the aforementioned Banana Peeler stripper.

Operation of the tool is as follows: The depth of cutter member 50 is determined by the thickness of the jacket of the cable to be stripped, and this distance is dialed in by adjustment of knob 48 (preferably ⅔ of the jacket thickness). To strip the cable, thumb lever 20 is depressed to raise the clamping and cutting head 40, and cable 32 is placed in channel 30 so that the axes of the cable and tool 10 are perpendicular. Cable 32 is held with one hand while the other hand grasps handle 12 and rotates tool 10 in a full circle so that cutter 50 cuts the full circumference of the cable jacket 36. The cutting and clamping head 40 is then raised by thumb lever 20 and the cable end 32 is then placed in channel 28 so that the cut circumference is below cutter 50 and the end of the cable is toward the handle end of the tool 10. Thumb lever 20 is released so that cutter member 50 penetrates the jacket, and the tool 10 is slid outward toward the end of the cable so that cutter member 50 cuts the jacket 36 parallel to the cable axis. This is repeated several times around the circumference of the cable. The cut jacket end 36 may be easily removed to expose the insulation 34 of the cable. Should the depth of cutter member 50 need adjustment in the circumferential or parallel cuts, the knob 48 may be adjusted accordingly and the operation may be repeated.

Various cable diameters and cable jacket thicknesses may be accommodated by the present invention. Adjustment to the jacket thickness may be easily and quickly made between different types of cable. The simple, easy to manufacture design of the present invention also accommodates retrofitting on existing tools.

While the present invention has been described with reference to a specific embodiment, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A tool for stripping jacket from cable comprising:
   means for holding a portion of said cable; and
   means for clamping said cable against said holding means and cutting said jackets,
   said clamping and cutting means including a surface for bearing against the exterior of the jacket on said cable and a cutter member for cutting said jacket, said cutter member being secured on a central member extending above an adjustment knob and adjustable by rotation of said knob toward and away from said cable to vary the depth of cut of the jacket of the cable held in the holding means, said central member being removably secured by screw means for replacement of said cutter member.

2. The tool of claim 1 wherein said clamping and cutting means comprises a housing having said bearing surface on its lower side, a vertical shaft having threads on at least a portion of its exterior and securing said cutter member, an annular knob rotatable in said housing and having interior threads mating with said shaft threads to move said shaft and said cutter member toward and away from said cable.

3. The tool of claim 2 wherein said cutter member extends from an opening in said bearing surface.

4. The tool of claim 3 wherein said knob and said housing include indicia to indicate the distance said cutter member is extended beyond said bearing surface and the depth of cut into said jacket.

5. The tool of claim 2 wherein said shaft includes stop means to limit the travel of said cutter member.

6. The tool of claim 2 further including detent means for restricting rotation of said annular knob and fixing said cutter member at a desired cutting depth.

7. The tool of claim 2 further including a releasable, spring-loaded assembly for urging said clamping and cutting means against cable held in the holding means.

8. The tool of claim 7 comprising a hand held tool.

9. The tool of claim 1 wherein said holding, clamping and cutting means are rotatable relative to the axis of said cable to cut the circumference of said jacket.

10. The tool of claim 1 wherein said holding clamping and cutting means are slidable relative to the axis of said cable to cut said jacket parallel to said axis.

11. The tool of claim 1 wherein said holding, clamping and cutting means are rotatable and slidable relative to the axis of said cable to cut said jacket around its circumference and parallel to said axis.

12. A hand tool for stripping jacket from cable comprising:
   means for holding a portion of said cable;
   means for clamping said cable against said holding means and cutting said jacket; and
   means for urging said clamping and cutting means against cable held in the holding means,
   said clamping and cutting means including a housing having a surface on its lower side for bearing against the exterior of the jacket on said cable, a cutter member secured on a central member and extending from an opening in the bearing surface for cutting said jacket, a vertical shaft having threads on at least a portion of the exterior and securing said central member and cutter member, and an annular knob rotatable in said housing and having interior threads mating with said shaft threads to move said shaft and said cutter member toward and away from said cable to vary the depth of cut of the jacket of the cable held in the holding means, said central member extending above said annular knob and being removably secured by screw means for replacement of said cutter member,
   said holding, clamping and cutting means being rotatable and slidable relative to the axis of said cable to cut said jacket around its circumference and parallel to said axis.

13. The tool of claim 12 wherein said knob and said housing include indicia to indicate the distance said cutter member is extended beyond said bearing surface and the depth of cut into said jacket.

14. The tool of claim 12 wherein said shaft includes stop means to limit the travel of said cutter member and further including detent means for restricting rotation of said annular knob and fixing said cutter member at a desired cutting depth.

15. A cable jacket clamping and cutting device for mounting on a tool having a pair of perpendicular, intersecting channels for holding cable and a releasable, spring-loaded lever arm for urging said device against cable held in either of said channels at a point above the intersection of said channels whereby said tool is rotatable and slidable relative to the axis of said cable to cut the cable jacket around its circumference and parallel to said axis, the device comprising a housing having means for mounting on said lever arm; a surface on the housing lower side for bearing against the exterior of said jacket to clamp cable in either of said channels; a cutter member secured to a central member for cutting said jacket; a vertical shaft having threads on at least a portion of its exterior and securing said central member and cutter member; and an annular knob rotatable in said housing having interior threads mating with said shaft threads to move said shaft and said cutter member toward and away from said cable to vary the depth of cut of the jacket of cable held in either of said channels, said central member extending above said annual knob and being removably secured by screw means for replacement of said cutter member.

16. The device of claim 15 wherein said cutter member extends from an opening in said bearing surface.

17. The device of claim 16 wherein said knob and said housing include indicia to indicate the distance said cutter member is extended beyond said bearing surface and the depth of cut into said jacket.

18. The device of claim 15 further including detent means in said housing to restrict rotation of said annular knob and fix said cutter member at a desired cutting depth.

19. A tool for stripping jacket from cable comprising: means for holding a portion of said cable; and
means for clamping said cable against said holding means and cutting said jackets,
said clamping and cutting means including a housing having a surface on its lower side for bearing against the exterior of the jacket on said cable, a vertical shaft having threads on at least a portion of its exterior securing a cutter member for cutting said jacket, said shaft comprising an outer sleeve having said exterior threads and a central member secured to said cutter member, the central member being adjustably secured to said sleeve to adjust the longitudinal position of said cutter member with respect to said sleeve, and an annular knob rotatable in said housing and having interior threads mating with said shaft threads to move said shaft and said cutter member toward and away from said cable to vary the depth of cut of the jacket of the cable held in the holding means.

20. The tool of claim 19 wherein said central member is romovable from said sleeve.

21. A tool for stripping jacket from cable comprising; means for holding a portion of said cable; and
means for clamping said cable against said holding means and cutting said jacket,
said clamping and cutting means including a housing having a surface on its lower side for bearing against the exterior of the jacket on said cable, a vertical shaft having threads on at least a portion of its exterior securing a cutter member for cutting said jacket, and an annular knob rotatable in said housing and having interior threads mating with said shaft threads to move said shaft and said cutter member toward and away from said cable and to vary the depth of cut of the jacket of the cable held in the holding means, said shaft including ring members above and below said annular knob as stop means to limit the travel of said cutter member.

22. A tool for stripping jacket from cable comprising; means for holding a portion of said cable; and
means for clamping said cable against said holding means and cutting said jacket,
said clamping and cutting means including a housing having a surface on its lower side for bearing against the exterior of the jacket on said cable, a vertical shaft having threads on at least a portion of its exterior securing a cutter member for cutting said jacket, an annular knob rotatable in said housing and having interior threads mating with said shaft threads to move said shaft and said cutter member toward and away from said cable, and detent means securable by a set screw in said housing to prevent rotation of said annular knob and fix said cutter member at a desired depth.

23. A hand tool for stripping jacket from cable comprising:
means for holding a portion of said cable;
means for clamping said cable against said holding means and cutting said jacket; and
means for urging said clamping and cutting means against cable held in the holding means,
said clamping and cutting means including a housing having a surface on its lower side for bearing against the exterior of the jacket on said cable, a cutter member extending from an opening in the bearing surface for cutting said jacket, a vertical shaft having threads on at least a portion of the exterior and securing said cutter member, said shaft comprising an outer sleeve having said exterior threads and a removable central member secured to said cutter member, the central member being adjustably secured to said sleeve to adjust the longitudinal position of said cutter member with respect to said sleeve, and an annular knob rotatable in said housing and having interior threads mating with said shaft threads to move said shaft and said cutter member toward and away from said cable to vary the depth of cut of the jacket of the cable held in the holding means, said knob and said housing including indicia to indicate the distance said cutter member is extended beyond said bearing surface and the depth of cut into said jacket,
said holding, clamping and cutting means being rotatable and slidable relative to the axis of said cable to cut said jacket around its circumference and parallel to said axis.

24. A cable jacket clamping and cutting device for mounting on a tool having a pair of perpendicular, intersecting channels for holding cable and a releasable, spring-loaded lever arm for urging said device against cable held in either of said channels at a point above the intersection of said channels whereby said tool is rotatable and slidable relative to the axis of said cable to cut the cable jacket around its circumference and parallel to said axis, the device comprising a housing having means for mounting on said lever arm; a surface on the housing lower side for bearing against the exterior of said jacket to clamp cable in either of said channels; an cutter member for cutting said jacket, a vertical shaft having threads on at least a portion of its exterior and securing said cutter member, said shaft comprising an outer sleeving having said exterior threads and a central member secured to said cuter member, the central member being adjustably secured to said sleeve to adjust the longitudinal position of said cutter member with respect to said sleeve; and an annular knob rotatable in said housing having interior threads mating with said shaft threads to move said shaft and said cutter member toward and wary from said cable to vary the depth of cut of the jacket of cable held in either of said channels.

25. The device of claim 24 wherein said central member is romovable from said sleeve.

26. A cable jacket clamping and cutting device for mounting on a tool having a pair of perpendicular, intersecting channels for holding cable and a releasable, spring-loaded lever arm for urging said device against cable held in either of said channels at a point above the intersection of said channels whereby said tool is rotatable and slidable relative to the axis of said cable to cut the cable jacket around its circumference and parallel to said axis, the device comprising a housing having means for mounting on aid lever arm; a surface on the housing lower side for bearing against the exterior of said jacket to clamp cable in either of said channels; a cutter member for cutting said jacket; a vertical shaft having threads on at least a portion of its exterior and securing said cutter member; and an annular knob rotatable in said housing having interior threads mating with said shaft threads to move said shaft and said cutter member toward and away from said cable to vary the depth of cut of the jacket of cable held in either of said channels, said shaft including ring members above and below said annular knob to limit the travel of said cutter member.

* * * * *